United States Patent
Federmann

[11] Patent Number: 5,802,784
[45] Date of Patent: Sep. 8, 1998

[54] WINDOW APPARATUS FOR PROVIDING AND DIRECTING GLARE-FREE SUNLIGHT TO A ROOM

[76] Inventor: Helmut Federmann, Holunderweg 17, 51427 Bergisch Gladbach, Germany

[21] Appl. No.: 786,439

[22] Filed: Jan. 21, 1997

[30] Foreign Application Priority Data

Jan. 26, 1996 [DE] Germany .................. 296 01 308.0

[51] Int. Cl.$^6$ .................................................. E04B 9/24
[52] U.S. Cl. ............... 52/204.5; 52/786.1; 52/786.13; 52/788.1; 359/595; 359/596; 359/598; 359/591
[58] Field of Search ........................... 359/591, 593, 359/595, 596, 597, 598; 52/200, 204.5, 786.1, 786.11, 786.13, 788.1

[56] References Cited

U.S. PATENT DOCUMENTS

| 631,220 | 8/1899 | Manning | 52/786.11 X |
| 2,179,862 | 11/1939 | Rolph | 359/595 |
| 4,035,539 | 7/1977 | Luboshez | 52/786.11 X |
| 4,089,594 | 5/1978 | Ewin | 359/595 |
| 4,130,351 | 12/1978 | Luboshez | 359/596 |
| 4,443,987 | 4/1984 | Erb | 52/786.11 X |
| 5,295,051 | 3/1994 | Cowling . | |
| 5,461,496 | 10/1995 | Kanada et al. | 359/595 X |
| 5,655,339 | 8/1997 | DeBlock et al. | 52/200 |

FOREIGN PATENT DOCUMENTS

| 0524388B1 | 5/1992 | European Pat. Off. . |
| 103721 | 6/1898 | Germany . |
| 1084212 | 8/1954 | Germany . |
| 1043240 | 9/1954 | Germany . |
| 3430191A1 | 8/1984 | Germany . |
| 4403276A1 | 1/1994 | Germany . |
| 4442228C1 | 11/1994 | Germany . |
| 194867 | 12/1937 | Switzerland . |

Primary Examiner—Carl D. Friedman
Assistant Examiner—Laura A. Callo
Attorney, Agent, or Firm—Bauer & Schaffer

[57] ABSTRACT

A stack of light-deflecting elements are installed in a window. Each deflecting element has a solar ray inlet, a curved middle section and an end comprising a ray outlet into the room. Each element is rectilinear at the outlet end so that rays are dispersed and emerge from the light-deflecting elements in prisms of rays, the bottom edge of which is horizontal. The solar rays entering the light-deflecting elements are subjected to multiple total internal reflections at a different angle. The angle of the normal line of the deflector elements to the horizontal is selected so that the largest possible amount of sunlight can be captured and conveyed into the room to illuminate the room with a uniform, diffuse distribution.

28 Claims, 5 Drawing Sheets

WINDOW APPARATUS FOR PROVIDING AND DIRECTING GLARE-FREE SUNLIGHT TO A ROOM

BACKGROUND OF THE INVENTION

This invention relates to apparatus for providing a room with glare-free diffused sunlight and, in particular, to a window system through which radiant sunlight is diffused and directed to selected areas of the room.

It has been known to provide apparatus for attempting to illuminate a room with glare-free sunlight. Such known apparatus is not completely successful in providing day-long light in all seasons.

Workrooms and office areas must be illuminated as uniformly as possible so that persons sitting or standing at their place of work have sufficient light available and are not dazzled by glare or undiffused light. However, uniform glare-free illumination is difficult to achieve with sunlight since the sun assumes different positions over the course of the day and at different times of the year. Specifically, the incidence of sunlight through a fixed window or skylight into a room to be illuminated varies constantly to have different angles of elevation and different lateral angles, thus falling randomly in the room.

It is often desirable only to illuminate certain locations within a room with uniform sunlight for the entire day. For example, a machine location or a workbench should be well lit while the remainder of the room may be kept in half-light. Consequently, the solar rays which are incident through a skylight or a high window must be accurately deflected onto the desired location, while at the same time ensuring that there is good dispersion and uniform brightness throughout the day.

In order to supply a room with glare-free, diffused sunlight, it is known to provide glass blocks on the wall of the room which is exposed to the sun. Such blocks disclosed in German patent publication DE-AS 1 084 212 comprising horizontally disposed prisms direct the light rays upwards towards the ceiling, which is thereby intensively irradiated, and which then diffusely reflects the light. However, the room brightness is not uniform, and the illumination is not controlled.

In order to achieve uniform, diffused illumination, it has been known also from the aforementioned German Patent publication, that vertical ribs can be disposed on the outside of the hollow blocks. These ribs reflect and scatter the light rays in the horizontal direction so that the light rays are not only deflected towards the ceiling but are also in part initially deflected in the horizontal direction, whereby scattering of the light in a horizontal direction is also effected.

It is also known from German Patent Publication DE-AS 1 043 240 to provide high windows so that the light intensity can be made more uniform even when the sun changes altitude. In this known design, a high window or skylight consisting of two glass panes spaced from each other, each bearing parallel prisms on their mutually opposite internal faces are used. The exterior pane facing the sun reflects the solar rays which are incident at a steep angle, whilst it allows solar rays which are incident at a shallow angle to pass through. The inner pane facing the room is also provided with prisms; these deflect the impinging solar rays and thereby scatter them.

Lighting elements with prismatic light guides are also known from German Patent Publication DE-OS 3 430 191, where light from a central light source, for example from the sun, is guided through the interior of an elongated hollow body, the peripheral faces of which are substantially disposed in the form of an octagon. The solar rays are always totally internally reflected at the internal faces and emerge from the transparent peripheral wall at points where the nature of the surface of the internal walls of the luminous element is altered so that it is possible to cause the prismatic light to illuminate defined locations.

Light guides of this type are costly and elaborate and are only suitable as spot-lighting and are not suitable for filling a room with glare-free, diffused sunlight.

A daylight illumination device is known from EP 0524388B1 in which light-deflecting holograms are disposed on a transparent pane in the exterior wall of a building. These holograms concentrate incident light into a narrow, horizontal, angular range of emergence and are provided with light guidance elements for vertical deflection. These light guidance elements are arcuate bodies, having light admission faces and light outlet faces disposed at an angle to each other which differs from zero. In this manner, incident daylight is directed towards the ceiling of the room adjacent the wall in which the daylight illumination device is disposed.

SUMMARY OF THE INVENTION

The object of the present invention is to construct apparatus to direct incident sunlight into a room, irrespective of the solar altitude or angle at the time of the year so that defined locations of the room, for example the ceiling and the top part of the walls of the room, or a working area disposed therein, are illuminated uniformly and free from glare and with substantially the same intensity throughout the day.

According to the present invention there is at least one curved light-deflecting element made of transparent material disposed within a wall of the room exposed to the sun. The light-deflecting elements have a light admission face, an outlet face and at least one intermediate guiding interface for the solar rays. At least one end of the intermediate section, preferably the end near the outlet face is formed rectilinear to provide a defined path for the light for diverting the rays to and through the outlet face. The elements are constructed in such a way that those solar rays which impinge on the admission face disperse the solar rays towards a defined location of the room, the admission face and the outlet face being disposed at an angle to each other.

The advantage of the present invention lies in the fact that all the parallel solar rays which enter the light-deflecting element in an ordered manner emerge from the light-deflecting element in a random, nonparallel, manner but with a substantially uniform distribution. Since a portion of the solar rays which are reflected upwards in the curved middle part is reflected downwards again in the rectilinear end path, the light rays which are fanned out by reflection are uniformly distributed within their angular range of emergence so that a very uniform illumination is produced with a high light yield.

The rays coming from the curved middle section are totally reflected, internally or refracted in the guiding path, depending on their angle of incidence. The rays which are totally internally reflected remain in the light-deflecting element and emerge from the outlet face within a limited angular range, whilst the refracted rays leave the light-deflecting element laterallly through the guiding interface.

The light-deflecting elements may be of a very short length, e.g. a few millimeters, and can easily be accommodated between the glass panes of an insulating glass window. There is, therefore, no cleaning problem, and the device according to the invention always remains effective.

It may be necessary to provide the rectilinear end adjacent the outlet face with a "functional layer" (i.e. functioning to transmit light) at its peripheral face so as to only allow rays to emerge from the outlet face within a limited angular range. This "functional layer" consists of a material which is preferably transparent, having the refractive index $n_K$ matched to the refractive index $n_L$ of the light-deflecting material in such a way that only those rays which are totally internally reflected at the guiding interface leave the outlet face in the form of a cone of light or a prism of light with an aperture angle β between 60° and 72°. If the end which bears the outlet face is inclined so that the bottom edge of this cone of light or prism of light runs horizontally then the space above this bend is filled almost completely with glare-free light.

It is advantageous if a layer of absorption material is disposed on the outlet face of the functional layer, which absorption layer absorbs the solar rays emerging from the light-deflecting element from the peripheral face thereof. Scattered light is thereby prevented from reaching sections of the room in which it would cause a person working in the room to be dazzled by its glare.

The absorption layer may be a barrier layer which is impervious to light but can also be constructed as a light-attenuating layer. For special applications, the absorption layer can also be a colored layer which is at least partially impervious to light. This results in the scattered radiation entering the room as colored light, whilst the main light which is directed towards the ceiling or towards a workplace remains white.

It is particularly advantageous for the functional layer to be an adhesive by which a plurality of light-deflecting elements can be joined to each other or to a supporting means. Such means may be advantageously a transparent film which is coated on both sides with adhesive and is applied all over the peripheral faces of the light-deflecting elements to be joined. In this respect, either the adhesive or the film can be the functional layer which has the refractive index $n_K$ described above.

The absorption layer may also be a sheet-like support which is impervious to light and which bears an adhesive on two mutually opposite faces completely covering those faces. By the adhesive bonding of a plurality of light-deflecting elements with absorption layers which are impervious to light disposed therebetween prevents the solar rays emerging from the individual light-deflecting elements from crossing over into adjacent light-deflecting elements and giving rise to scattered radiation.

An even better light yield is obtained if the outlet end of the light-deflecting element has planar bottom and top faces where the bottom face has a reflection layer on the outer surface of the functional layer and the top face has an absorption layer on the outer face of the functional layer. The reflection layer can be manufactured from a film of synthetic material which is transparent in cross-section but which is vacuum-coated with aluminum on its outer face. The absorption layer may be formed from a thin film of synthetic material which is impervious to light. Both layers are preferably adhesively bonded in a bubble-free manner to the surface to the light-deflecting element with the aid of a pressure-sensitive cold-bonding adhesive, which forms the functional layer.

The transparent light-deflecting element may also consist of glass. However, it preferably consists of a synthetic thermoplastic material in a glassy state and most preferably consists of polycarbonate (PC), which has a refractive index of $n_L$=1.586. If a plurality of light-deflecting elements made of polycarbonate are joined with an acrylic-based (acrylate) adhesive bonding agent which performs as the functional layer and has a refractive index of $n_K$=1.491, a very large aperture of ±32.7° at the outlet face of the light-deflecting elements can be formed. Thus, even the ceiling area of a very high room which is to be illuminated can be irradiated completely.

The light-deflecting element is preferably an elongated thin plate of substantially constant thickness, one planar longitudinal edge forms the inlet face and the other planar longitudinal edge forms the outlet face for the solar rays. The middle part is curved transversely to the longitudinal axis and adjoins the rectilinear outlet end. Elongated light-deflecting elements of this type can be installed over practically the entire length of a surrounding wall of a room and can produce a continuous row of windows which absorbs the largest possible amount of light and transmits it to the preferred locations of the room.

So that sunlight can be absorbed and used for room lighting, practically the whole year, the deflecting element is preferably curved and installed in the surrounding face of the room in such a way that the normal line on the admission fact forms an angle with the horizontal, which corresponds to the greatest possible angle of elevation of the sun at the average solar altitude over the year at the place of installation. At the same time, the normal line on the outlet face of the light-deflecting element forms an angle with the horizontal which corresponds to the largest possible half aperture angle (aperture) of the luminous beam emerging from the outlet face. Thus, not only the solar rays which are incident in summer when the solar altitude is high but also the solar rays which are incident in winter when the solar altitude is low can, at any time of the day, enter the light-deflecting element, where they are transmitted and scattered. When the light rays emerge from the outlet face, they may take a conical or prismatic array, although the entire body of rays remains within the desired upper region of the room since the bottom edge of the cone of rays coincides with the horizontal.

In order to convey a sufficient amount of light into a room, a plurality of light-deflecting elements may be stacked one upon the other with at least one of their end closely adjacent to each other and which are separated from each other in the region of their guiding interfaces. The light is thereby introduced from a complete stack of light-deflecting elements. In this stack, the guiding interfaces at the end parts of adjacent light-deflecting elements are separated from each other by absorption layers which are coated all over on both sides with adhesive, and the guiding interfaces at the middle are separated from each other by air gaps. In the region of the middle parts, the light rays cannot emerge, but are completely totally internally reflected. In the region of their ends, individual rays which impinge on the guiding interfaces at an angle which is less than the critical angle between the material of the light-deflecting element and that of the adhesive are led out of the light-deflecting element. They then disappear in the absorption layer and can thereby produce no scattered light. With this form of construction, all the light-deflecting plates can also be of the same thickness and can have the same shape so that they can be produced economically.

Many light-deflecting elements can be assembled and stacked accurately one above another. To do this, the light-deflecting elements may be formed with projections at their inlet ends extending at right angles to further form enlarged inlet faces. These projections serve to permit adjacently stacked light-deflecting elements to fit and engage one above another. The light-deflecting elements are thereby adjusted automatically to have an optimum aspect to the sun when a stack is built up, resulting in an accurate construction of the device, which ensures the optimum light yield.

A stack comprising a plurality of adjacent light-deflecting elements, which are preferably adhesively bonded to each other, can be disposed between two transparent panes of a window in such a way that the outlet faces of the light-deflecting elements are oriented towards the location of the room which is to be illuminated. For complete illumination of a room, the stack can be disposed in the upper part or light of a window, the lower light of which is shaded when subject to direct solar irradiation. For illumination of an individual workplace the stack of light-deflecting elements can be disposed in a high window or ceiling light so that the light falls downwards onto a workplace.

By installing a stack of light-deflecting elements between the panes of a hermetically sealed window, for example of a window with insulating glazing, the light-deflecting elements are protected from becoming soiled from UV radiation and from atmospheric influences; this has a positive effect on the operational reliability and useful life of the light-deflecting elements.

In order to prevent different levels of brightness at different locations in the room during the course of a day, uniform distribution of the direction of the emerging solar rays can be provided at the outlet face by providing light scattering means or material over the outlet. A profiled dispersion lens made of transparent material can also be disposed behind the outlet face of the light-deflecting element in the direction of the rays to effect such scattering.

It is particularly advantageous to integrally construct the outlet face with a sine wave contour, the contour having rectilinear, parallel waves on its ray emergence side, where the wavelength g corresponds approximately to 3.64 times the amplitude $a_0$ and the wave crests run perpendicularly to the longitudinal edges of the light-deflecting element. A construction of the light scattering means such as this results in a particularly uniform distribution of the light over the entire day.

Further features and advantages of the invention follow from the description given below and from the drawings, in which preferred embodiments of the invention are illustrated by way of examples.

DETAILED DESCRIPTION OF THE INVENTION

Figure 1:
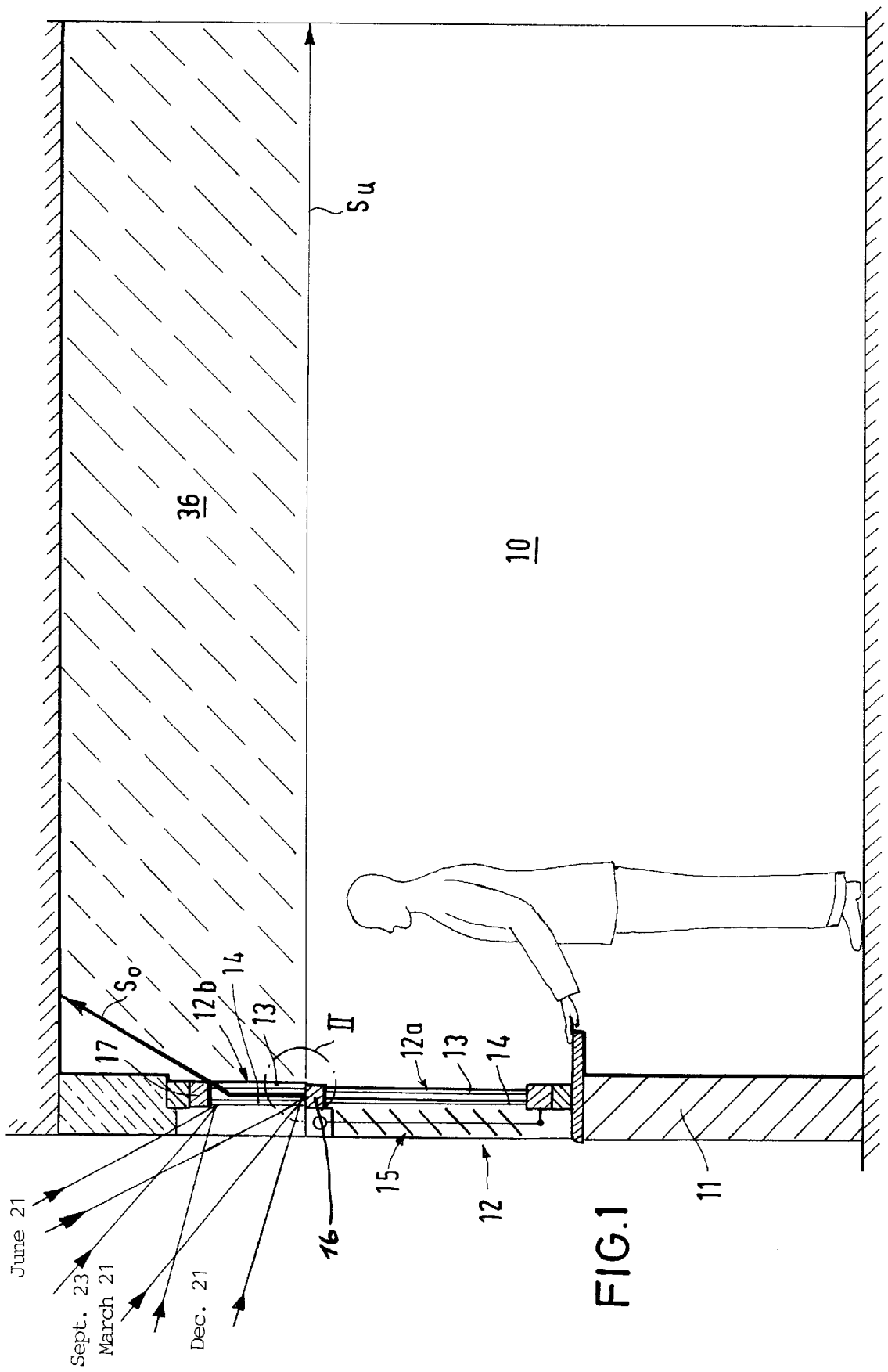
FIG. 1 is a schematic cross sectional illustration of a room, which is to be uniformly illuminated with a device according to the present invention.

As seen in FIG. 1, a window 12, which can extend over part or over the entire length of a room 10, is disposed in an exterior wall 11 exposed to sunlight such as on the south side of the room 10. The window 12, preferably of hermetically sealed insulating glass, has a lower part 12a which consists of two transparent panes 13 and 14 disposed lateral spaced from each other. A blind 15 is disposed on the outside of the window so that it can be shaded. The blind 15 can be raised as far as the middle frame bar 16 of the window, if daylight is to enter also through the lower part 12a of the window 12, when the sky is overcast.

The upper part 12b of the window 12 is likewise formed of insulating glazing, comprising an inner pane 13 and an outer pane 14, extending between the middle frame bar 16 and the top frame bar 17. In the example illustrated, the upper panes are at a spacing from each other of about 10 mm, so that an air gap 18 is formed between the two transparent panes 13 and 14. A plurality of mutually adjacent light-deflecting elements 19 are stacked one above the other within the air gap 18. The light-deflecting elements extend over the entire length of the window 12 and in cross section have the shape illustrated in FIG. 2.

Each of the light-deflecting elements 19 consists of a solid, transparent material; in the embodiment illustrated a transparent synthetic thermoplastic material in the glassy state is used, polycarbonate (PC), having an optical refractive index of $n_L = 1.586$.

Figure 2:
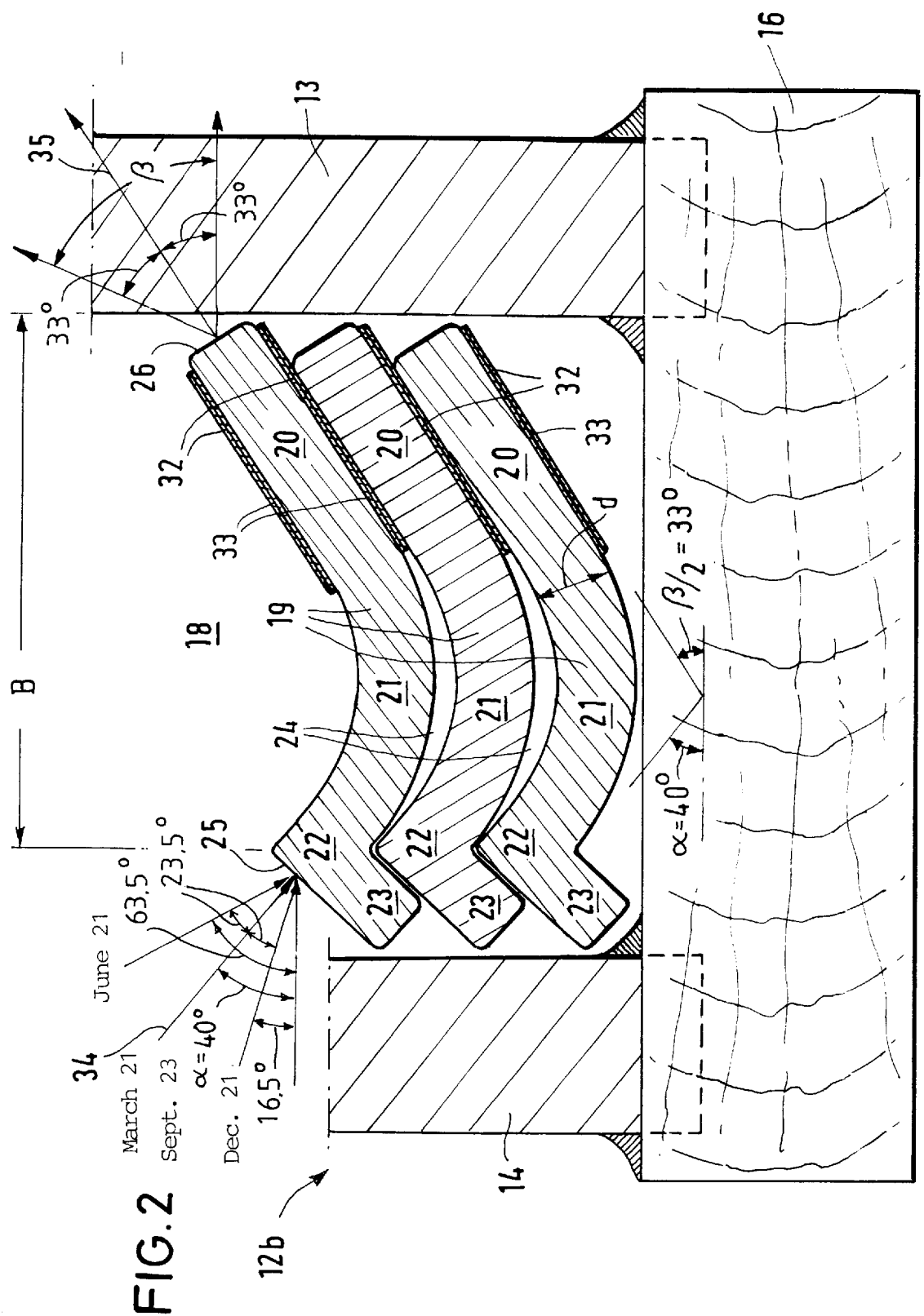
FIG. 2 illustrates the device according to the invention, in area II of FIG. 1, on a considerably enlarged scale.
Figure 3:
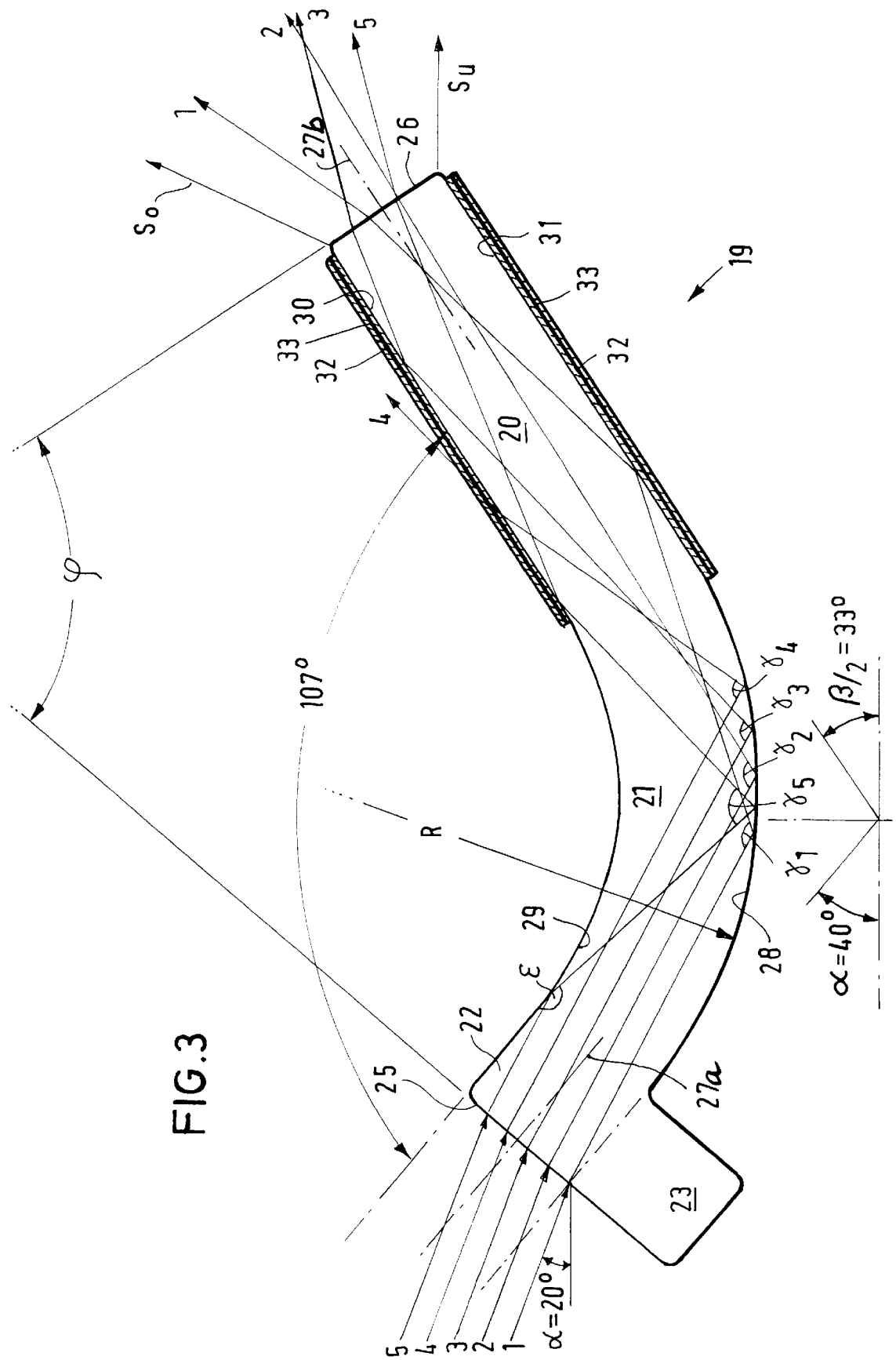
FIG. 3 is a vertical cross section through one of the light-deflecting elements illustrated in FIG. 2, in which the beam path of solar rays incident at an angle of elevation of 20° is illustrated on a scale which is further enlarged compared with that of FIG. 2.

As can be seen from FIGS. 2 and 3, the light-deflecting elements 19 are elongated thin plates having a length substantially that of the width of the window and a substantially constant thickness d over their entire width B. Each light-deflecting element 19 comprises a substantially rectilinear inner end 20, a middle 21, which is curved transversely to the longitudinal axis of the light-deflecting element, and an outer end 22. The outer end 22 has a projection 23 which extends at right angles to the ends. The light-deflecting elements 19 rest on top of each other with a positive fit of their inner ends 20 and engage one above another with their projections 23. The curvature of the section 21 is more pronounced on its top face than on its bottom face, thus defining a compound curve creating air gaps 24 between the adjacent light-deflecting elements 19, stacked one on top of another in the region of their mid-sections 21.

As can be seen in more detail from FIG. 3, the outer ends 22 form an inlet face 25 for the solar rays, which are incident thereon in parallel planes. Only some of the rays 25 are illustrated in FIG. 3, being denoted by reference numerals 1, 2, 3, 4, and 5. The rectilinear inner end 20 forms an outlet face 26 at its end.

The curvature of the mid-section 21 is selected so that the central plane 27a perpendicular to the outer inlet face 25 and the central plane 27b perpendicular to the inner outlet face 26 (i.e. also faces 25 and 26) form an angle φ with each other, the value of which depends on the latitude of the place of installation. In the example of the embodiment which is illustrated here, this angle φ is about 73°.

As seen from the example of FIG. 2, it may be assumed that when the beam path of the solar rays 1, 2, 3, 4, and 5, which are incident in parallel planes, impinge on the outer face 25 of the polycarbonate light-deflecting element 19 at an angle of incidence α=20° to the horizontal and travel into the interior. At the interface 25 between the air and polycarbonate material, they are refracted towards the vertical and impinge, in the region of the mid-section 21, on the curved lower face 28, which is also described hereinafter as the "guiding interface" of the light-deflecting element. At this guiding interface between the optically more dense polycarbonate material and the air gap 24, each impinging solar ray 1, 2, 3, 4 is completely reflected within the element 19 at a different angle, $\gamma_1$, $\gamma_2$, $\gamma_3$, and $\gamma_4$, since the solar rays 1, 2, 3, 4 which enter in superimposed parallel planes impinge on the guiding interface 28 at different angles at adjacent points.

While the solar rays 1 to 4 travel after they enter the deflecting element 19, rectilinearly as far as the lower peripheral face 28, the solar rays 5 which are incident in the uppermost plane first impinge on the upper curved face 29 after they enter the light-deflecting element 19. These upper rays 5 are reflected at an angle ε and are directed downwardly towards the opposite, lower face 28, where they too are also totally reflected internally at an angle of $\gamma_5$.

It is preferable that the radius of curvature R of the lower guiding interface 28, at which the solar rays are reflected in the interior of the light-deflecting element be as large as possible. In the present case, the mid-section 21 is curved in the form of a circular arc and adjoins the end parts 20 and 22 tangentially. The mid-section may also be curved in the form of another form of curve.

As can be seen from FIG. 3, the rays 1, 2, 3, 4 and 5, which are reflected from the guiding interface 28 are transmitted into the rectilinear inner end part 20, where they impinge on its planar top face 30 or its planar bottom face 31, which are likewise "guiding interfaces". In contrast to the mid-section, in which all the solar rays 1 to 5 are reflected and are thereby deflected and transmitted, in the region of the rectilinear inner end part 20, only those rays 1, 2, 3 and 5 are reflected and transmitted which impinge on the guiding interfaces 30 and 31 at an angle which is greater than the critical angle for total internal reflection. Rays which impinge on the planar guiding interfaces 30 and 31 at a lesser angle, such as the ray 4, are not reflected but emerge laterally from the light-deflecting element and are lost.

According to the present invention, it is intended that the incident solar rays are to be directed into quite a defined part of the room 10. For example, with the embodiment illustrated in FIG. 1 the rays are to be deflected only into the top third of the room so that persons working in the room cannot be dazzled with light. Furthermore, as much light as possible is to enter this top third of the room to be diffusely reflected from the ceiling and from the surrounding walls of the room into the bottom part of the room. Consequently, the solar rays have to emerge from the outlet face of the elements 19 in a conical array which is as large as possible. An angle of emergence β of 90° would be ideal but this can only be achieved with high loss of light at the planar guiding interfaces 30 and 31. If loss of light is to be substantially prevented and if the lowermost solar rays $S_u$ of the prism of rays are to emerge and travel horizontally in the room, the rectilinear end 20 of the light-deflecting element 19 should be inclined at an angle β/2 to the horizontal so that the aperture angle β falls between 60° and 72°. In order to produce an aperture such as this, it is necessary to provide the guiding interfaces 30 and 31 of the rectilinear inner end part 20 of the light-deflecting element 19 with a "functional layer", the refractive index $n_k$ of which is matched to the refractive index $n_L$ of the material of the light-deflecting element 19 in such a way that only those rays are reflected at the respective guiding interface 30, 31 which leave the outlet face 26 within the cone of light or in a prism of light which has an aperture angle of approximate β=66°. According to the invention, an aperture angle such as this can be achieved if the "functional layer" has a refractive index $n_k$=1.491. The "functional layer" at the guiding interfaces 30 and 31, therefore, cannot be air.

As has already been explained above, the stacked light-deflecting elements 19 rest with their end parts 20 one on another. They may thus be joined with an adhesive 32 which forms the "functional layer". The adhesive layer 32 is situated between the planar top faces 30 and bottom faces 31 of the end 21. Preferably, an acrylic-based (acrylate) adhesive bonding agent having an optical refractive index $n_k$=1.491 coated on a sheet-like supporting means 33 impervious to light such as a thin, black film of synthetic material is used. This black film of synthetic material forms an absorption layer in which the light rays which are decoupled from the inner end part 20 at the guiding interfaces 30 and 31 thereof are absorbed so that they will not stray and will not enter adjacent light-deflecting elements.

It can be seen that for the light rays 1, 2, 3, and 5, which are reflected at the guiding interfaces 30 and 31 and which reach the outlet face 26, a numerical aperture NA=sin β/2 gives $$NA = \sqrt{n_L^2 - n_k^2} = 0.54,$$

which corresponds to an aperture angle of β≅2.33°=66°.

In order to ensure that solar rays only reach the top third of the room 10, as illustrated in FIG. 1, the lowermost solar rays $s_u$ emerging from the outlet face 26 must be caused to travel horizontally. Thus, the uppermost rays $S_0$ of the prism of rays emerging from the outlet face 26 of the uppermost light-deflecting elements 19 in the stack will reach the ceiling of the room at an angle of 66° to the horizontal so that almost the entire ceiling area of the room 10 is irradiated.

As seen in FIG. 2, the angle α made between the perpendicular line 34 on the admission face 25 and the horizontal is determined for the respective place of installation according to the highest solar altitude in the middle of the year, namely according to the highest angle of elevation of the sun on March 21 or September 23, which at 50° latitude (e.g. in the city of Mainz, Germany) amounts to 40°. On June 21 this highest angle of elevation of the sun is 23.5° higher, and on December 21 it is 23.5° lower. It follows from this that the highest solar altitudes vary within an angular range of 47° over the year, and within the course of the day, starting in the morning, the solar altitude at 50° latitude can reach an angle of elevation of 63.5° to the horizontal at midday. Since the sunlight at 50° of latitude has its highest luminous intensities which can be used for indirect room lighting within the vertical angular range between 16.5° and 63.5° over the course of the year, the outer end part 22 of the light-deflecting element 19 is disposed at an angle of 40° to the horizontal, which bisects the entire range of the angle of elevation.

This angle, of course, has to be different at other places of installation if the maximum incidence of light there is to be utilized over the year.

It can be seen that with the construction and arrangement of the light-deflecting elements 19 which has been described it is possible to capture the largest possible amount of light throughout the whole year, to scatter the solar rays which are incident in parallel on the outer end 22 by multiple total internal reflections in the curved mid-section 21 and the rectilinear end 20 and to conduct this light in scattered form but in a uniform distribution to a defined location 36 in a room 10 and thereby to fill the entire room with glare-free, diffused light. It can also be seen that the light-deflecting elements 19 can easily be manufactured individually and can be reliably stacked one above another and can be accommodated adhesively bonded in the air space 18 of a insulating double-pane glass window where they are removed from environmental effects and from contamination so that their efficacy is not impaired even after extended periods of use.

Figure 4:
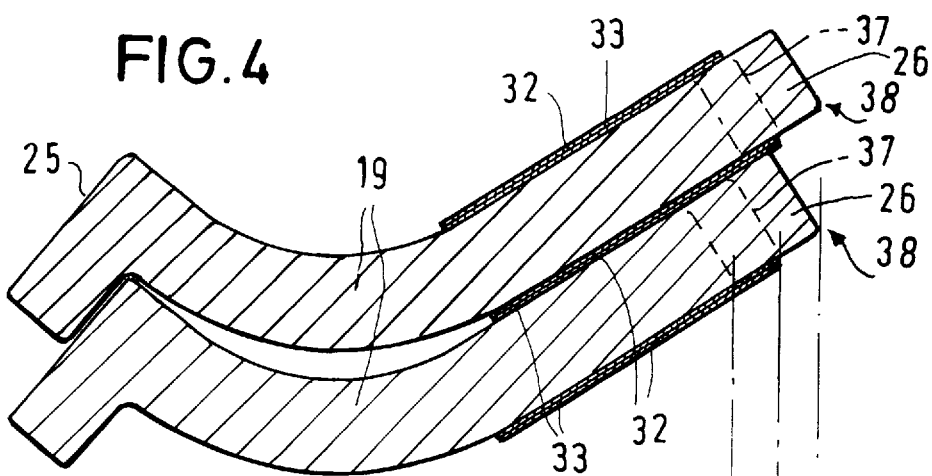
FIG. 4 is a vertical cross section through two light-deflecting elements of a stack of such elements showing light scattering elements at their outlet faces.
Figure 5:
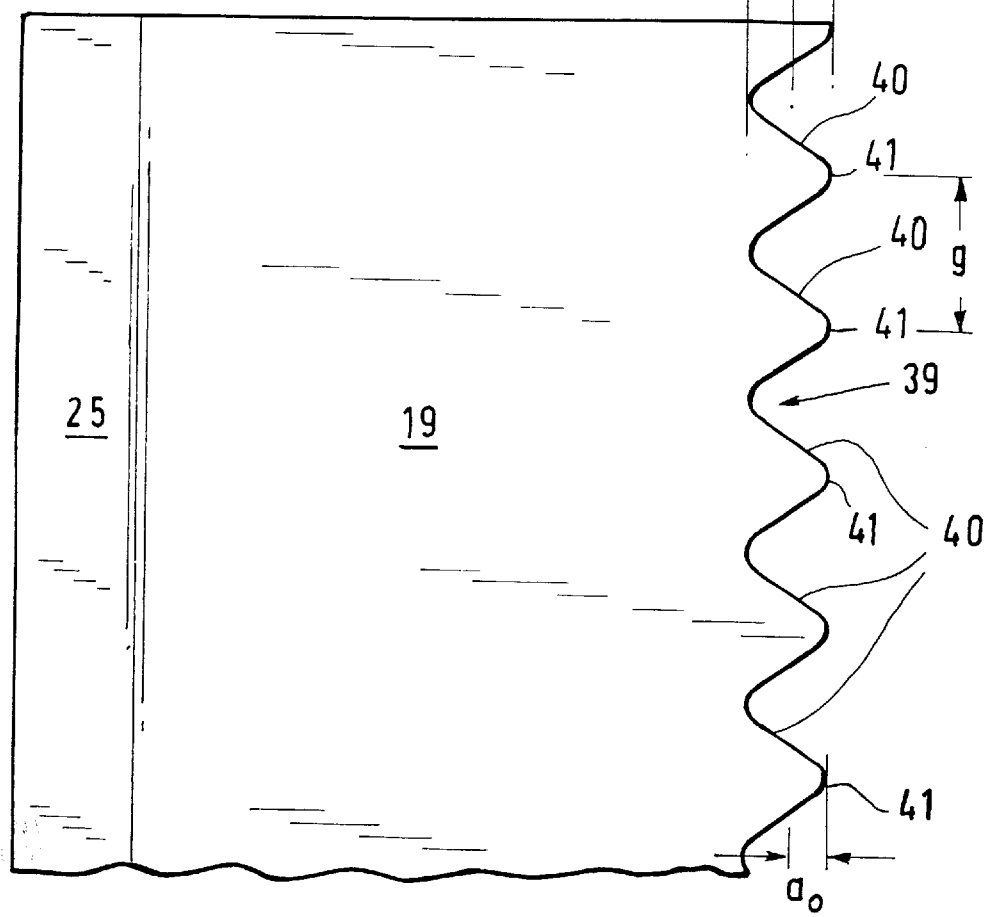
FIG. 5 is a partial plan view of the stack of FIG. 4.

In order to also achieve uniform illumination of the room 10 over the course of a day and to take into account the migration of the sun in a horizontal direction from east via south to west, auxiliary light scattering means 37 such as shown in FIGS. 4–5 may be provided. With the auxiliary means 37, the solar rays which are incident in different directions over the course of a day can be distributed more uniformly at the outlet face 26 of the light-deflecting elements 19. This auxiliary light scattering means 37 horizontally fans out those solar rays which are incident in parallel and deflects them towards the middle of the room. The auxiliary means 37 illustrated in FIGS. 4 and 5 is formed as an integral part of the outlet face 26 itself, wherein the inner longitudinal edge 38 of the light-deflecting elements 19 is constructed with a sine wave surface 39 which has rectilinear, parallel waves 40, the wave crests 41 of which run perpendicularly to the longitudinal edges 38 of the light-deflecting element 19. The wavelength g of the sine wave approximately corresponds to 3.64 times the amplitude $a_0$. The solar rays which are incident obliquely in the morning and afternoon are deflected towards the middle of the room by a wave-like profile 39 of the outlet faces 26. This results in uniform illumination of the room 10 over the entire length thereof.

The same effect can also be achieved if a profiled dispersion lens made of transparent material is disposed behind the outlet face 26 of the light-deflecting element 19 in the direction of the rays. However, an embodiment such as this is not illustrated in the drawings.

Figure 6:
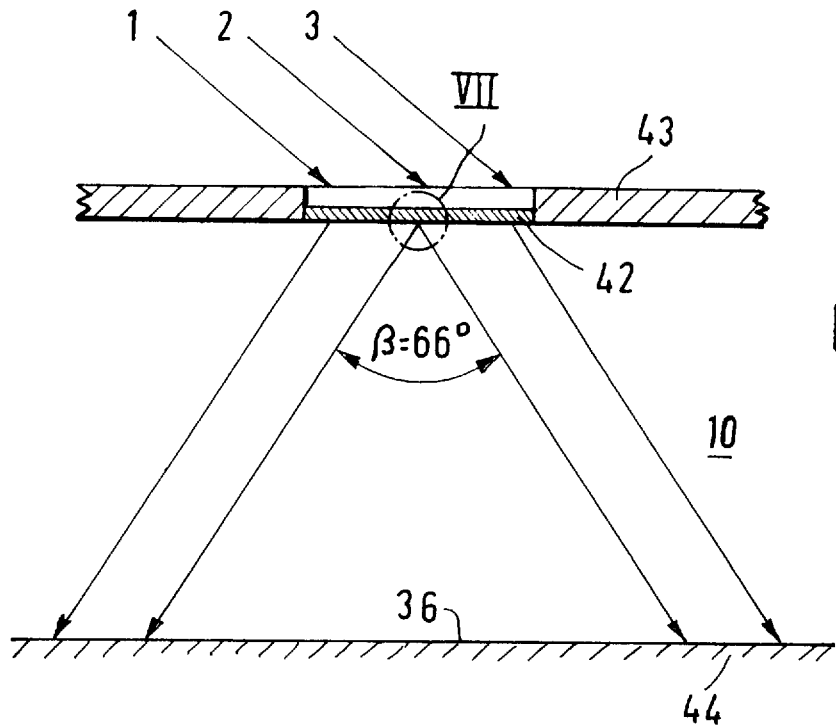
FIG. 6 is a partial vertical section through a room provided with a roof light or high window, in which a floor area is illuminated by a device according to the invention.
Figure 7:
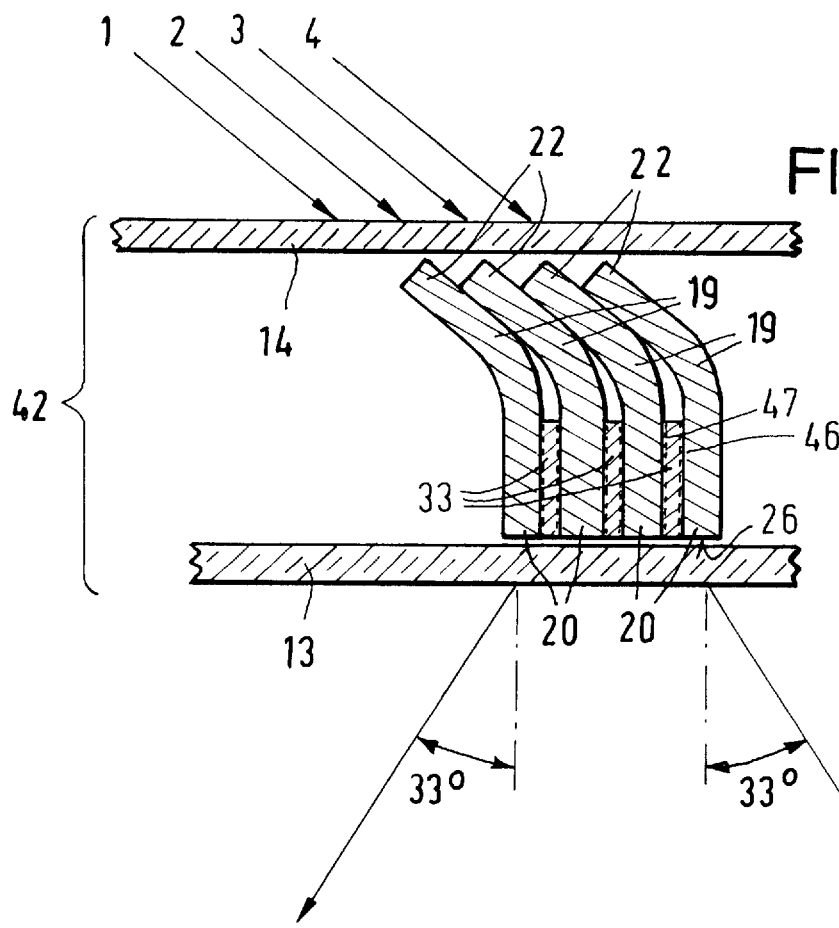
FIG. 7 shows the detail contained in section VII of FIG. 6 on a considerably enlarged scale.

FIGS. 6 and 7 illustrate another embodiment of the invention, in which the light-deflecting elements 19 are disposed between two glass panes 13 and 14 in a skylight 42. These elements direct the solar rays 1, 2, 3 falling on a flat roof 43 onto a location on the floor 44, i.e. of a factory bay 45 in order to obtain uniform illumination there over the entire day.

In this embodiment, the inner ends 20 of the light-deflecting elements 19 are disposed with their outlet faces 26 directly above the inner glass pane 13 of the skylight 42, and the elongated outer ends 22, which are also rectilinear, are adjacent to each other. In this embodiment, the inner end parts 20 are at a somewhat greater spacing from each other, and it is necessary to provide light-absorbing, sheet-like supporting plates 33 between them. These supporting plates bear an adhesive 32 forming the "functional layer" on their mutually opposite faces 46 and 47 so that the adjacent elements 19 can be joined by their end parts 20. Solar rays which impinge on the guiding interfaces at an angle which is less than the critical angle for total internal reflection are deflected into the absorption plates 33 as described in detail earlier and are absorbed there, whilst the multiple-reflected light rays emerging from the outlet face 26 are directed onto the floor 36 of the factory bay in a cone of light with an aperture angle of 66°.

The invention is not restricted to the examples illustrated and described. Rather, numerous modification and additions are possible without departing from the scope of the invention. For example, it is also possible for light-deflecting elements according to the present invention to be fixedly installed in a wall if no special windows are provided. Moreover, the light-deflecting elements according to the invention can be installed not only in flat roofs but also in double-ridged roofs, and it is also possible for the light-deflecting elements to be fashioned differently. For example, providing a different curvature to the middle section and varying the angle between the admission face and the outlet face is possible in order to adapt the light-deflecting elements to the respective place of installation, i.e. of the respective latitude and the path of the sun thereof. Finally, other solid transparent materials can be used such as glass or synthetic materials similar to glass together with functional layers which are suitable therefor, provided that their refractive indices can advantageously be matched to each other.

In order to increase the light yield, it is also possible to provide at least the rectilinear inner end parts 20 of the light-deflecting elements 19 with a reflection layer at their planar bottom faces, for example with a film of synthetic material which is vacuum-metallized on its outer face and only to provide an absorption layer at the planar top face of the inner end part 20. It is thereby ensured that no light rays can emerge at the lower guiding interface in any event but that rays which also impinge thereon at a steeper angle are reflected towards the upper guiding interface.

Various modifications and changes have been disclosed herein, and others will be apparent to those skilled in this art. Therefore, it is to be understood that the present disclosure is by way of illustrating and not limiting of the present invention.

What is claimed is:

1. A window apparatus for providing glare-free diffused sunlight to a room, said apparatus comprising at least one light-deflecting element having an inlet face adapted to be exposable to the sun's rays, an outlet face adapted to be exposable to the room to be lit and an intermediate section for guiding and dispersing the sun's rays to and through said outlet face toward a selected location in the room, the said inlet face and said outlet face being disposed at an angle to each other and the intermediate section being curved and being formed rectilinearly at least at its end adjoining the outlet face to have mutually opposing peripheral faces forming a guide path for said rays.

2. The apparatus according to claim 1, wherein the end of said light deflecting element is coated with a functional layer of light refractive material having a refractive index matched to the refractive index of said light deflecting element so that only those rays which are internally reflected within said end leave the outlet face shaped within an aperture angle between 60° to 72°.

3. The apparatus according to claim 2, wherein the shape of the rays leaving the outlet face are prismatic.

4. The apparatus according to claim 2, wherein the shaping of the rays leaving the outlet face is conical.

5. The apparatus according to claim 2, including a layer of light absorbing material disposed on the surface of said light refractive layer.

6. The apparatus according to claim 5, wherein said light absorbing material is applied in a layer to be impervious to light.

7. The apparatus according to claim 5, wherein said light absorbing material in a layer to light attenuating.

8. The apparatus according to claim 5, wherein said light absorbing material layer comprises a color filter.

9. The apparatus according to claim 1, including a plurality of light-deflecting elements fixedly stacked one upon the other.

10. The apparatus according to claim 9, wherein a transparent film is interposed between each of the stacked light-deflecting elements, said film having adhesive on each surface to fixedly support said deflecting elements.

11. The apparatus according to claim 10, wherein said film is made of reflective material.

12. The apparatus according to claim 10, wherein the end of the light-deflecting element has a planar bottom face and a planar top face and the planar bottom face is provided with a reflective layer and the planar top face is provided with a light absorbing layer.

13. The apparatus according to claim 12, wherein the absorbing layer is a sheet supporting means which is impervious to light, said supporting means bears adhesive on each surface by which adjacent light-deflecting elements in said stack are joined to each other.

14. The apparatus according to claim 12, wherein the reflective layer is a transparent film of synthetic material which is vacuum-coated with aluminum on the surface of the film remote from the light-deflecting element.

15. The apparatus according to claim 12, wherein the light-deflecting element consists of a synthetic thermoplastic material in a glassy state.

16. The apparatus according to claim 15, wherein the light-deflecting element consists of polycarbonate.

17. The apparatus according to claim 15, wherein the adhesive is an acrylic based (acrylate) adhesive bonding agent.

18. The apparatus according to claim 12, wherein said deflecting elements are disposed within a pair of hermetically sealed parallel window panes.

19. The apparatus according to claim 12, wherein the outlet face is provided with means for scattering the light and uniformly distributing the light over the course of the day.

20. The apparatus according to claim 19, wherein said scattering and distributing means is integrally formed with said outlet face.

21. The apparatus according to claim 19, wherein said scattering and distributing means comprises a profiled dispersion lens.

22. The apparatus according to claim 19, wherein the light scattering and distribution means has a sine wave face with rectilinear, parallel waves emerging from the outlet face, the wavelength of said same wave being approximately 3.64 times the amplitude and the wave crests, said sine wave running perpendicularly to the longitudinal edges of the light-deflecting element.

23. The apparatus according to claim 9, wherein the light deflecting elements are formed so that the intermediate sections of adjacently stacked deflecting elements are separated from each other by an air gap therebetween.

24. The apparatus according to claim 23, wherein the ends of the light deflecting elements include projections extending at right angles to the light deflecting elements so that adjacent light-deflecting elements engage one another in said stack.

25. The apparatus according to claim 24, wherein the projections extending at the inlet face of each of said deflecting elements are planar.

26. The apparatus according to claim 9, wherein the light-deflecting elements are joined by means of an adhesive, the adhesive being a layer of light-refractive material.

27. The apparatus according to claim 1, wherein the light-deflecting element is an elongated thin plate of substantially uniform thickness having a longitudinal edge forming the inlet face and another planar longitudinal edge forming the outlet face, the intermediate section being curved transversely to the longitudinal axis of the light deflecting element.

28. The apparatus according to claim 27, when installed in the wall of a building is arranged so that the inlet face of the light-deflecting element forms an angle with the horizontal, said angle being calculated as the maximum angle of elevation of the sun at the annual average solar altitude at the site where the building is placed, and that the outlet face of the light-deflecting element forms an angle with the horizontal calculated to correspond to the maximum half angle of the light rays emerging from the outlet face.

* * * * *